United States Patent [19]

Horacek

[11] Patent Number: 5,382,649

[45] Date of Patent: Jan. 17, 1995

[54] THERMOPLASTIC POLYESTER-IMIDES FROM TRIMELLITIC ACID, PROPANEDIPHENOL AND AN AROMATIC DIAMINE WHICH HAVE IMPROVED MECHANICAL PROPERTIES, THEIR PREPARATION AND THEIR USE

[75] Inventor: Heinrich Horacek, Puchenau, Austria

[73] Assignee: Chemie Linz GmbH, Austria

[21] Appl. No.: 149,807

[22] Filed: Nov. 10, 1993

[30] Foreign Application Priority Data

Nov. 10, 1992 [AT] Austria ................ 2210/92

[51] Int. Cl.$^6$ .......................................... C08G 73/16
[52] U.S. Cl. .............................. 528/170; 528/183; 528/184; 528/185; 528/190; 528/191; 528/193; 528/194; 528/208; 528/322
[58] Field of Search .............. 528/170, 191, 193, 194, 528/183, 185, 190, 322, 208

[56] References Cited

U.S. PATENT DOCUMENTS

| | | | |
|---|---|---|---|
| 3,895,064 | 7/1975 | Brode et al. | 564/315 |
| 4,116,941 | 9/1978 | Hanson | 528/185 |
| 4,609,702 | 9/1986 | Zamek | 528/172 |
| 4,631,333 | 12/1986 | Kricheldorf et al. | 528/170 |
| 4,757,118 | 7/1988 | Das et al. | 528/165 |
| 4,771,113 | 9/1988 | Das et al. | 525/508 |
| 4,801,676 | 1/1989 | Hisgen et al. | 528/170 |
| 4,861,857 | 8/1989 | Kricheldorf et al. | 528/170 |
| 4,882,410 | 11/1989 | Neugebauer et al. | 528/170 |
| 4,923,953 | 5/1990 | Neugebauer et al. | 528/170 |
| 5,109,100 | 4/1992 | Fujiwara et al. | 528/170 |
| 5,147,962 | 9/1992 | Tanisake et al. | 528/170 |

FOREIGN PATENT DOCUMENTS

| | | |
|---|---|---|
| 0325739 | 8/1989 | European Pat. Off. |
| 0341397 | 11/1989 | European Pat. Off. |
| 3516427 | 11/1986 | Germany |
| 3802511 | 8/1989 | Germany |
| 558306 | 6/1977 | U.S.S.R. |
| 759561 | 9/1980 | U.S.S.R. |
| 876684 | 10/1981 | U.S.S.R. |
| 943859 | 7/1982 | U.S.S.R. |

OTHER PUBLICATIONS

Loncrini, "J. Polymer Sci. Part A-1", 4 1531-1541 (1966).
Chem. Abstr. 83 12: 97982w (1975).
Chem. Abstr. 104: 6315u (1986).
Chem. Abstr. 110: 9440r (1989).
CPI-Abstracts Profile 1989, Ref. 89-019710/03 and JP 63-295634, May 27, 1987.

*Primary Examiner*—John Kight, III
*Assistant Examiner*—P. Hampton-Hightower
*Attorney, Agent, or Firm*—Wenderoth, Lind & Ponack

[57] ABSTRACT

Thermoplastic polyester-imides having improved mechanical properties, characterized in that they consist of recurring units of the formula I

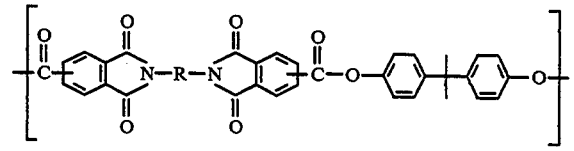

in which R denotes an 2,4-tolylene, 2,6-tolylene, 2,5-bis(4-phenylenethio) thiadiazole, or a 1,4-bis(phenylenethio)diphenyl sulfone radical, a process for their preparation and their use for the production of industrial components of plastic.

4 Claims, No Drawings

THERMOPLASTIC POLYESTER-IMIDES FROM TRIMELLITIC ACID, PROPANEDIPHENOL AND AN AROMATIC DIAMINE WHICH HAVE IMPROVED MECHANICAL PROPERTIES, THEIR PREPARATION AND THEIR USE

The invention relates to thermoplastic polyester-imides from trimellitic acid, propanediphenol and an aromatic diamine which have improved mechanical properties, their preparation and their use.

The most important heat-stable polymers industrially to date are completely aromatic polyimides, but as a rule these are neither fusible nor soluble and therefore can be processed only with effort and expensively.

The somewhat less heat-stable aromatic polyamides are likewise non-fusible and insoluble or only slightly soluble in most organic solvents, so that their processing from solution to fibers or films is associated with great difficulties.

The difficult processability makes these heat-stable polymers considerably more expensive and excludes them from a number of fields of use.

Although the processability of the polymers has been improved by incorporation of flexible chain elements (—CH$_2$—, —O—, —S—, —CO—) or sterically bulky groups, a usually considerable loss of heat stability has had to be accepted.

These polymers also include polyamide-imides and polyester-imides, in which aromatic amide and imide or ester and imide groups are arranged randomly and which are usually soluble or have thermoplastic properties, but likewise have a low heat stability (U.S. Pat. No. 3,895,064). The actual solution to the problem in the field of thermoplastic polymers thus still lies in the development of new products with high heat stability, good processability and good mechanical properties.

The object of the present invention was to develop new thermoplastic polyester-imides which, while having a high heat stability, are soluble and/or fusible in the cyclized form and therefore can be processed easily by conventional methods, and which have improved mechanical properties.

It has now been found that this object can be achieved with the aid of polyester-imides which are built up from trimellitic acid, propanediphenol and an aromatic diamine.

The invention therefore relates to thermoplastic polyester-imides having improved mechanical properties, which are characterized in that they consist of recurring units of the formula I

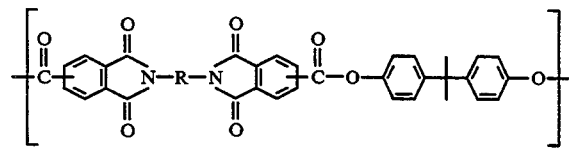

in which R denotes an 2,4-tolylene, 2,6-tolylene, 2,5-bis(4-phenylenethio)thiadiazole or 1,4-bis(phenylenethio)diphenyl sulfone radical.

The invention furthermore relates to a process for the preparation of polyester-imides of the formula I

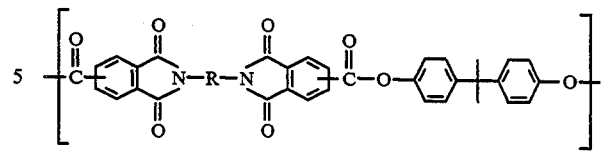

in which R is as defined above, which is characterized in that trimellitic acid or trimellitic acid anhydride or anhydride chloride or a trimellitic acid anhydride ester or trimellitic acid ester is reacted with
2,4- or 2,6-tolylenediamine, 2,5-bis(4-aminophenylthio) thiadiazole,
or with 1,4-bis(4-aminophenylthio)diphenyl sulfone in a diluent which is inert under the reaction conditions, water being split off, to give a diimide-dicarboxylic acid of the formula II

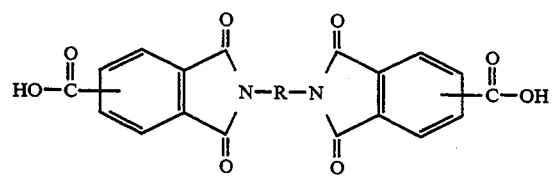

in which R is as defined above, and the diimide-dicarboxylic acid is then converted into a thermoplastic polyester-imide by reaction with propanediphenol, if appropriate in the presence of a catalyst, water being split off.

In the first reaction step, the aromatic diamines are reacted with trimellitic acid, trimellitic acid anhydride, trimellitic acid anhydride chloride, a trimellitic acid ester or trimellitic acid anhydride methyl, ethyl or isopropyl ester. Trimellitic acid anhydride is preferably employed.

The diamine and the trimellitic acid or the abovementioned trimellitic acid derivatives are preferably employed here in a molar ratio of about 1 : 2, but a slight excess of one of the reactants can also be used.

The reaction is preferably carried out in a diluent which is inert under the reaction conditions, such as, for example, N-methylpyrrolidone (NMP), dimethylformamide (DMF), dimethylacetamide (DMA), dimethyl sulfoxide (DMSO), tetramethylurea or hexamethylenephosphoric acid triamide (HMP). NMP or DMF is preferably employed as the diluent.

The reaction temperature can vary within a wide range, depending on the starting substances used and the desired end products. If the reactive trimellitic acid anhydrides or anhydride chlorides are used, the temperatures are between about −30° and +30° C., and if the less reactive acids or esters are employed, temperatures of up to about 150° C. are used.

The amide acids intermediately formed in this reaction are cyclized by heating at the reflux temperature for about 0.5 to 3 hours, preferably 1 to 2 hours, and the water formed during the reaction is distilled off. The diimide-dicarboxylic acids thus formed can then be isolated by customary methods, such as, for example, precipitation or crystallization, and if appropriate they can then be purified by customary methods, such as, for example, recrystallization or reprecipitation.

If the diimide-dicarboxylic acids are isolated, they are then melted in the second reaction step with an equivalent amount of propanediphenol in the presence of a catalyst, such as, for example, a titanate, such as tetraisopropyl titanate or tetrabutyltitanate. Tetraisopropyl titanate is preferably employed as the catalyst. The amount of catalyst is about 0.1 to 2% by weight, preferably 0.5 to 1.0% by weight.

The reaction temperature here is between about 110° and 190° C., preferably between 140° and 170° C. The water liberated is again distilled off, and if appropriate the polyester-imide thus obtained can be purified by customary methods, such as, for example, recrystallization, chromatography or reprecipitation.

However, the diimide-dicarboxylic acid formed in the first reaction step can also be further processed without isolation. In this case, the equivalent amount of propanediphenol is added directly to the reaction solution obtained in the first reaction step, after the water of reaction has been distilled off at the reflux temperature. The reaction mixture is kept at the reflux temperature for a further 0.5 to 3 hours, preferably 1 to 2 hours, and the water formed during the reaction is stripped off again. The polyester-imide thus prepared is then isolated by customary methods, such as, for example, precipitation or crystallization.

The thermoplastic polyester-imides prepared in this way are distinguished by improved mechanical properties, such as, for example, improved tensile strength, E modulus or extensibility, compared with the prior art. Furthermore, they have a temperature interval between the glass transition temperature and decomposition temperature which is more advantageous for processing, and high heat stability. On the basis of these advantageous properties, the polyester-imides according to the invention are suitable for the production of industrial components of plastic, for example for the electrical or electronics industry or for the automobile industry, for example for the production of insulating films for wire and motor coils, of printed circuit-boards or of coil cores for electric motors.

EXAMPLE I

Preparation of a polyester-imide I with 2,4-tolylenediamine 12.2 g (0.1 mol) of 2,4-tolylenediamine and 42 g (0.2 mol) of trimellitic acid anhydride were heated at the reflux temperature in 100 ml of DMF in a 500 ml flask for one hour and the water thereby liberated was distilled off.

22.8 g (0.1 mol) of propanediphenol were then added to the reaction solution, the mixture was kept at the reflux temperature for a further hour and the water formed was again distilled off. The reaction mixture was then poured into 1 l of water and the polyester-imide was filtered off.

Analogously to Example 1, a polyester-imide II was prepared with 2,6-tolylenediamine, a polyester-imide III with 1,4-his (4-aminophenylthio) diphenyl sulfone, and a polyester-imide IV with 2,5-bis(4-aminophenyl thio)thiadiazole.

The mechanical properties, such as film quality, E modulus, tensile strength (TS) and elongation (E), the intrinsic viscosity (IV), the glass transition point (Tg) and the heat stability (Td) of the polyester-imides I to IV are shown in Table 1 in comparison with a polyester-imide with p-phenylenediamine (Loncrini, J.Polymer Sci. Part A-1, Volume 4, pages 1531 to 1541, (1966)).

TABLE 1

| Polyester-imide | Tg (°C.) | IV (dl/g) | Film | TS 20° C. | (MPa) 200° C. |
|---|---|---|---|---|---|
| I | 280 | 0.98 | flexible | 100 | 55 |
| II | 275 | 1.21 | flexible | 110 | 65 |
| III | 290 | 0.91 | flexible | 110 | 60 |
| IV | 330 | 0.71 | flexible | 120 | 70 |
| Comparison | >500 | 1.03 | flexible | 60 | 35 |

| Polyester-imide | E modulus 20 °C. | (MPa) 200° C. | E (%) 20° C. | 200° C. | Td (°C.) |
|---|---|---|---|---|---|
| I | 3300 | 1520 | 6 | 15 | >500 |
| II | 3500 | 1700 | 8 | 16 | >500 |
| III | 3500 | 1600 | 8 | 13 | >500 |
| IV | 3400 | 1650 | 7 | 12 | >500 |
| Comparison | 2300 | 1000 | 5 | 8 | >500 |

What I claim is:

1. Thermoplastic polyester-imides having improved mechanical properties, characterized in that they consist of recurring units of the formula I

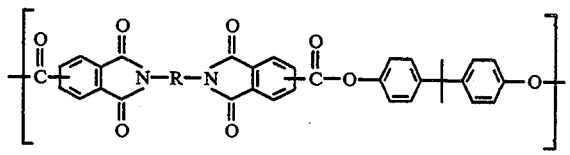

in which R denotes an 2,4-tolylene, 2,6-tolylene, 2,5-bis(4-phenylenethio)thiadiazole, or a 1,4-bis(phenylenethio)diphenyl sulfone radical.

2. Thermoplastic polyester-imides according to claim 1, characterized in that R denotes an 2,4-tolylene or 2,6-tolylene radical.

3. Thermoplastic polyester-imides according to claim 1, characterized in that R denotes a 2,5-bis(4-phenylenethio) thiadiazole or 1,4-bis(4-phenylenethio)diphenyl sulfone radical.

4. Process for the preparation of thermoplastic polyester-imides of the formula I

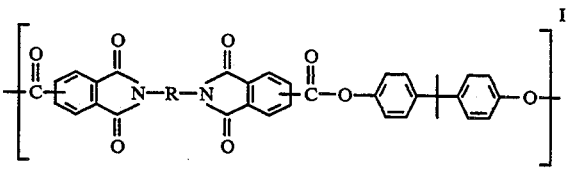

in which R is as defined in claim 1, which comprises reacting trimellitic acid or trimellitic acid anhydride or anhydride chloride or a trimellitic acid anhydride ester or trimellitic acid ester with 2,4- or 2,6-tolylenediamine, 2,5-bis(4-aminophenylthio)thiadiazole, or 1,4-bis(4-aminophenylthio)diphenyl sulfone in a molar ratio of about 2 : 1 in a diluent selected from the group consisting of N-methyl-pyrrolidone, dimethylformamide, dimethylacetamide, dimethylsulfoxide, tetramethyl urea or hexamethylenephosphonic acid triamide at a reaction temperature of −30° to 150° C., water being split off by heating to reflux temperature, to give a diimide-dicarboxylic acid of the formula:

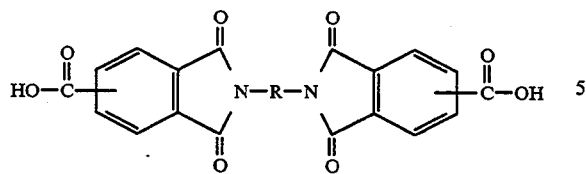

in which R is as defined in claim 1, and
converting the diimidedicarboxylic acid into a thermoplastic polyester-imide by reaction with propanediphenol at a reaction temperature between 110°–190° C., optionally in the presence of about 0.1 to 2% by weight of a catalyst selected from the group consisting of tetraisopropyltitanate and tetrabutyltitanate, water being split off.

* * * * *